United States Patent
Jose

(10) Patent No.: US 12,413,455 B2
(45) Date of Patent: Sep. 9, 2025

(54) ADAPTIVE AFE CALIBRATION TECHNIQUES

(71) Applicant: SAMSUNG ELECTRONICS CO., LTD., Suwon-si (KR)

(72) Inventor: Anup P. Jose, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 54 days.

(21) Appl. No.: 18/417,982

(22) Filed: Jan. 19, 2024

(65) Prior Publication Data

US 2025/0088395 A1    Mar. 13, 2025

Related U.S. Application Data

(60) Provisional application No. 63/537,743, filed on Sep. 11, 2023.

(51) Int. Cl.
*H04L 25/03* (2006.01)

(52) U.S. Cl.
CPC .......... *H04L 25/03057* (2013.01); *H04L 2025/03656* (2013.01)

(58) Field of Classification Search
CPC .......... H04L 25/03057; H04L 2025/03656
USPC .......... 375/231
See application file for complete search history.

(56) References Cited

U.S. PATENT DOCUMENTS

| | | | |
|---|---|---|---|
| 9,674,009 B2 * | 6/2017 | Dong | H04B 1/16 |
| 10,027,516 B2 | 7/2018 | Dong | |
| 11,323,297 B2 * | 5/2022 | Navid | H04B 10/541 |
| 2014/0169426 A1 * | 6/2014 | Aziz | H03F 3/195 |
| | | | 375/232 |
| 2021/0014087 A1 | 1/2021 | Ganesan et al. | |

FOREIGN PATENT DOCUMENTS

WO    2022/039945 A1    2/2022

* cited by examiner

*Primary Examiner* — Leila Malek
(74) *Attorney, Agent, or Firm* — Sughrue Mion, PLLC

(57) ABSTRACT

An adaptation engine included in a receiver of a serial data link, including at least one processor configured to: receive an error signal generated by an error slicer included in a decision feedback equalizer (DFE) and a data signal generated by a data slicer included in the DFE, perform a first iterative adaptation process corresponding to the AFE by adjusting a gain of the AFE based on the error signal and the data signal, and perform a second iterative adaptation process corresponding to the AFE by adjusting an degeneration resistance of a degeneration resistor included in the AFE based on the error signal and the data signal.

21 Claims, 14 Drawing Sheets

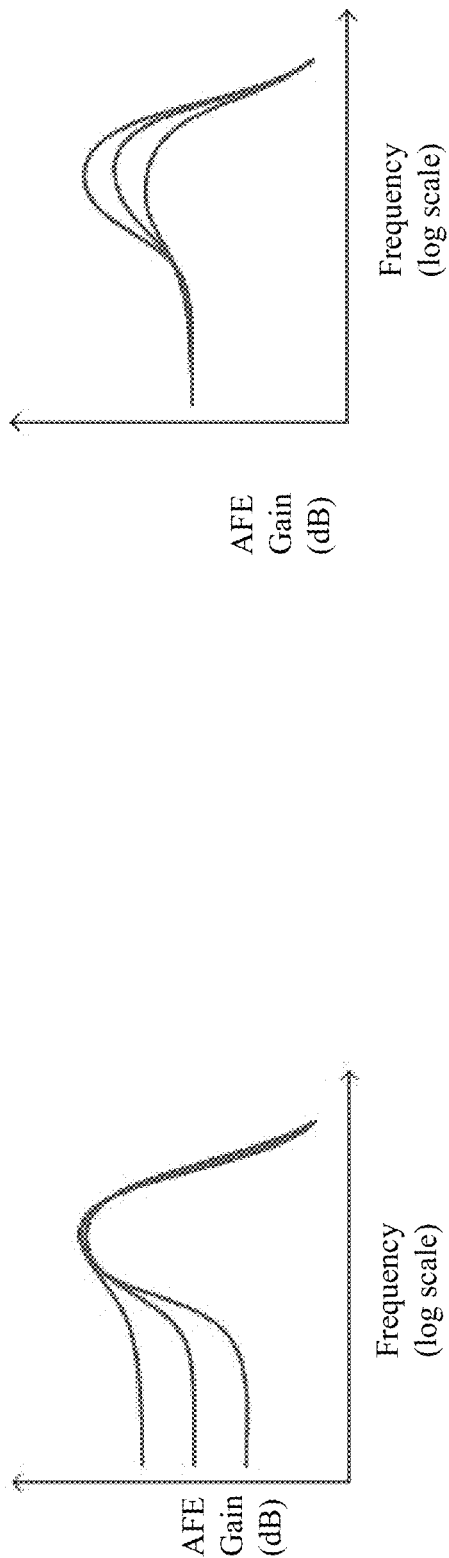
FIG. 4B
FIG. 4A
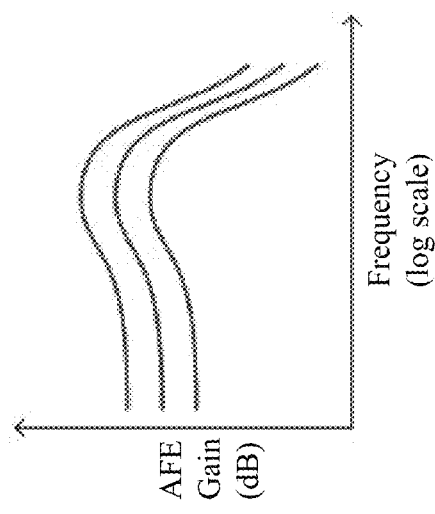
FIG. 4C

ADAPTIVE AFE CALIBRATION TECHNIQUES

CROSS-REFERENCE TO RELATED APPLICATION(S)

This application is based on and claims priority under 35 U.S.C. § 119 to U.S. Provisional Application No. 63/537,743, filed on Sep. 11, 2023, the disclosure of which is incorporated herein by reference in its entirety.

BACKGROUND

1. Field

The disclosure relates to high-speed serial data links, and more particularly to adaptive calibration of an analog front end of a high-speed serial receiver.

2. Description of Related Art

A channel used in a high-speed serial data link may have characteristics, such as frequency-dependent loss, or phase dispersion, that may result errors in the received data if measures are not taken to compensate. A receiver of the serial data link may include an analog front end (AFE), which may be used to compensate for a loss in channel of the serial data, and to equalize a response of the channel.

SUMMARY

Provided are a receiver for a serial data link, which may include an AFE, and an adaptation engine for performing adaptive calibration of the AFE, and a method of performing the adaptive calibration.

In accordance with an aspect of the disclosure, a receiver for a serial data link may include: an analog front end (AFE) configured to receive a serial data stream and to generate an AFE output signal based on the serial data stream; and a decision feedback equalizer (DFE) configured to receive the AFE output signal and to output deserialized data based on the AFE output signal, wherein the DFE includes an error slicer configured to output an error signal based on a comparison between the AFE output signal and a reference voltage. The receiver may further include an adaptation engine configured to perform a first adaptation process associated with the AFE, wherein the first adaptation process includes adjusting the reference voltage based on the error signal, and adjusting a gain of the AFE based on a comparison between the adjusted reference voltage and a reference voltage target.

The DFE may further include a data slicer configured to output a data signal based on a comparison between the AFE output signal and a zero voltage, and to perform the first adaptation process, the adaptation engine may be further configured to: initialize the reference voltage, initialize a tap value associated with the DFE based on the reference voltage, adjust the reference voltage until a value of the error signal is different from a value of the data signal, compare the adjusted reference voltage with a reference voltage target, and based on the adjusted reference voltage being less than the reference voltage target, increasing a gain of the AFE.

The adaptation engine may be further configured to increase the gain of the AFE by adjusting a feedback resistance of at least one feedback resistor included in the AFE, and the increasing the gain of the AFE may cause an inner eye opening included in an eye diagram corresponding to the AFE output signal to be increased in a vertical direction.

The adaptation engine may be further configured to: based on the adjusted reference voltage being less than the reference voltage target, perform the first adaptation process again, and based on the adjusted reference voltage being greater than or equal to the reference voltage target, exit the first adaptation process.

The receiver may include a phase interpolator configured to adjust a phase of a clock signal which is provided to the DFE, the AFE may include a degeneration resistor having a degeneration resistance, the adaptation engine may be further configured to perform a second adaptation process associated with the AFE, and to perform the second adaptation process, the adaptation engine may be further configured to: initialize the reference voltage, initialize the tap value based on the reference voltage, initialize the phase to a reference phase, adjust the phase until the value of the error signal is different from the value of the data signal, determine a current phase value by subtracting the reference phase from the adjusted phase, and based on the current phase value being greater than a previous phase value, increase the degeneration resistance.

The increasing the degeneration resistance may cause an inner eye opening included in an eye diagram corresponding to the AFE output signal to be increased in a horizontal direction.

The adaptation engine may be further configured to perform the second adaptation process after the first adaptation process is performed.

The adaptation engine may be further configured to: based on the current phase value being greater than the previous phase value, perform the second adaptation process again, and based on the current phase value being greater than the previous phase value being less than or equal to the reference voltage target, exit the second adaptation process.

To initialize the reference voltage, the adaptation engine may be further configured to: obtain the value of the error signal and the value of the data signal, based on the value of the error signal being same as the value of the data signal, increase the reference voltage, and based on the value of the error signal being different from the value of the data signal, decrease the reference voltage.

To initialize the tap value, the adaptation engine may be further configured to: obtain the value of the error signal and the value of the data signal, based on a previous value of the data signal being same as the value of the data signal, and based on the value of the error signal being same as the value of the data signal, increase the tap value, based on the previous value of the data signal being same as the value of the data signal, and based on the value of the error signal being different from the value of the data signal, decrease the tap value, based on the previous value of the data signal being different from the value of the data signal, and based on the value of the error signal being different from the value of the data signal, increase the tap value, based on the previous value of the data signal being different from the value of the data signal, and based on the value of the error signal being same as the value of the data signal, decrease the tap value.

In accordance with an aspect of the disclosure, an adaptation engine included in a receiver of a serial data link may include: at least one processor configured to: receive an error signal generated by an error slicer included in a decision feedback equalizer (DFE), wherein the error signal is generated by the error slicer based on a comparison between a reference voltage and an analog front end (AFE) output signal, and wherein the AFE output signal is generated by an AFE based on a serial data stream, receive a data signal generated by a data slicer included in the DFE, wherein the data signal is generated by the data slicer based on a comparison between a zero voltage and the AFE output signal, perform a first iterative adaptation process corresponding to the AFE by adjusting a gain of the AFE based on the error signal and the data signal, and perform a second iterative adaptation process corresponding to the AFE by adjusting a degeneration resistance of a degeneration resistor included in the AFE based on the error signal and the data signal.

To perform a current iteration of the first iterative adaptation process, the at least one processor may be further configured to: initialize the reference voltage, initialize a tap value associated with the DFE based on the reference voltage, adjust the reference voltage until a value of the error signal is different from a value of the data signal, compare the adjusted reference voltage with a reference voltage target, based on the adjusted reference voltage being less than the reference voltage target, increase the gain of the AFE, and perform a next iteration of the first iterative adaptation process, and based on the adjusted reference voltage being greater than or equal to the reference voltage target, exit the first iterative adaptation process.

The at least one processor may be further configured to increase the gain of the AFE by adjusting a resistance of at least one feedback resistor included in the AFE, and the increasing the gain of the AFE may cause an inner eye opening included in an eye diagram corresponding to the AFE output signal to be increased in a vertical direction.

To initialize the reference voltage, the at least one processor may be further configured to: obtain the value of the error signal and the value of the data signal, based on the value of the error signal being same as the value of the data signal, increase the reference voltage, and based on the value of the error signal being different from the value of the data signal, decrease the reference voltage, and to initialize the tap value, the at least one processor may be further configured to: obtain the value of the error signal and the value of the data signal, based on a previous value of the data signal being same as the value of the data signal, and based on the value of the error signal being same as the value of the data signal, increase the tap value, based on the previous value of the data signal being same as the value of the data signal, and based on the value of the error signal being different from the value of the data signal, decrease the tap value, based on the previous value of the data signal being different from the value of the data signal, and based on the value of the error signal being different from the value of the data signal, increase the tap value, based on the previous value of the data signal being different from the value of the data signal, and based on the value of the error signal being same as the value of the data signal, decrease the tap value.

The adaptation engine may include a phase interpolator configured to adjust a phase of a clock signal which is provided to the DFE, and to perform a current iteration of the second iterative adaptation process, the at least one processor may be further configured to: initialize the reference voltage, initialize a tap value associated with the DFE based on the reference voltage, initialize the phase to a reference phase, adjust the phase until the value of the error signal is different from the value of the data signal, determine a current phase value by subtracting the reference phase from the adjusted phase, based on the current phase value being greater than a previous phase value, increase the degeneration resistance, and perform a next iteration of the second iterative adaptation process, and based on the current phase value being less than or equal to the previous phase value, exit the second iterative adaptation process.

The increasing the degeneration resistance may cause an inner eye opening included in an eye diagram corresponding to the AFE output signal to be increased in a horizontal direction.

To initialize the reference voltage, the at least one processor may be further configured to: obtain the value of the error signal and the value of the data signal, based on the value of the error signal being same as the value of the data signal, increase the reference voltage, and based on the value of the error signal being different from the value of the data signal, decrease the reference voltage, and to initialize the tap value, the at least one processor may be further configured to: obtain the value of the error signal and the value of the data signal, based on a previous value of the data signal being same as the value of the data signal, and based on the value of the error signal being same as the value of the data signal, increase the tap value, based on the previous value of the data signal being same as the value of the data signal, and based on the value of the error signal being different from the value of the data signal, decrease the tap value, based on the previous value of the data signal being different from the value of the data signal, and based on the value of the error signal being different from the value of the data signal, increase the tap value, based on the previous value of the data signal being different from the value of the data signal, and based on the value of the error signal being same as the value of the data signal, decrease the tap value.

In accordance with an aspect of the disclosure, a method of adapting an analog front end (AFE) included in a receiver of a serial data link may include: receiving an error signal generated by an error slicer included in a decision feedback equalizer (DFE) included in the receiver, wherein the error signal is generated by the error slicer based on a comparison between a reference voltage and an AFE output signal, and wherein the AFE output signal is generated by the AFE based on a serial data stream; receiving a data signal generated by a data slicer included in the DFE, wherein the data signal is generated by the data slicer based on a comparison between a zero voltage and the AFE output signal; performing a first iterative adaptation process corresponding to the AFE by adjusting a gain of the AFE based on the error signal and the data signal; and performing a second iterative adaptation process corresponding to the AFE by adjusting an degeneration resistance of a degeneration resistor included in the AFE based on the error signal and the data signal.

Performing a current iteration of the first iterative adaptation process may include: initializing the reference voltage; initializing a tap value associated with the DFE based on the reference voltage; adjusting the reference voltage until a value of the error signal is different from a value of the data signal; comparing the adjusted reference voltage with a reference voltage target; based on the adjusted reference voltage being less than the reference voltage target; increasing the gain of the AFE, and performing a next iteration of the first iterative adaptation process; and based on the adjusted reference voltage being greater than or equal to the reference voltage target, exiting the first iterative adaptation process.

The initializing the reference voltage may include: obtaining the value of the error signal and the value of the data signal, based on the value of the error signal being same as the value of the data signal, increasing the reference voltage;

and based on the value of the error signal being different from the value of the data signal, decreasing the reference voltage, and the initializing the tap value may include: obtaining the value of the error signal and the value of the data signal; based on a previous value of the data signal being same as the value of the data signal, and based on the value of the error signal being same as the value of the data signal; increasing the tap value; based on the previous value of the data signal being same as the value of the data signal, and based on the value of the error signal being different from the value of the data signal, decreasing the tap value; based on the previous value of the data signal being different from the value of the data signal, and based on the value of the error signal being different from the value of the data signal, increasing the tap value; and based on the previous value of the data signal being different from the value of the data signal, and based on the value of the error signal being same as the value of the data signal, decreasing the tap value.

Performing a current iteration of the second iterative adaptation process may include: initializing the reference voltage; initializing a tap value associated with the DFE based on the reference voltage; initializing a phase of a clock signal which is provided to the DFE to a reference phase; adjusting the phase until the value of the error signal is different from the value of the data signal; determining a current phase value by subtracting the reference phase from the adjusted phase; based on the current phase value being greater than a previous phase value, increasing the degeneration resistance, and performing a next iteration of the second iterative adaptation process; and based on the current phase value being less than or equal to the previous phase value, exiting the second iterative adaptation process.

BRIEF DESCRIPTION OF THE DRAWINGS

These and/or other aspects will become apparent and more readily appreciated from the following description, taken in conjunction with the accompanying drawings in which:

FIGS. 4A-4C are graphs showing examples of tuning outputs of an analog front end of a receiver of a serial data link, according to an embodiment;

DETAILED DESCRIPTION

Figure 1:
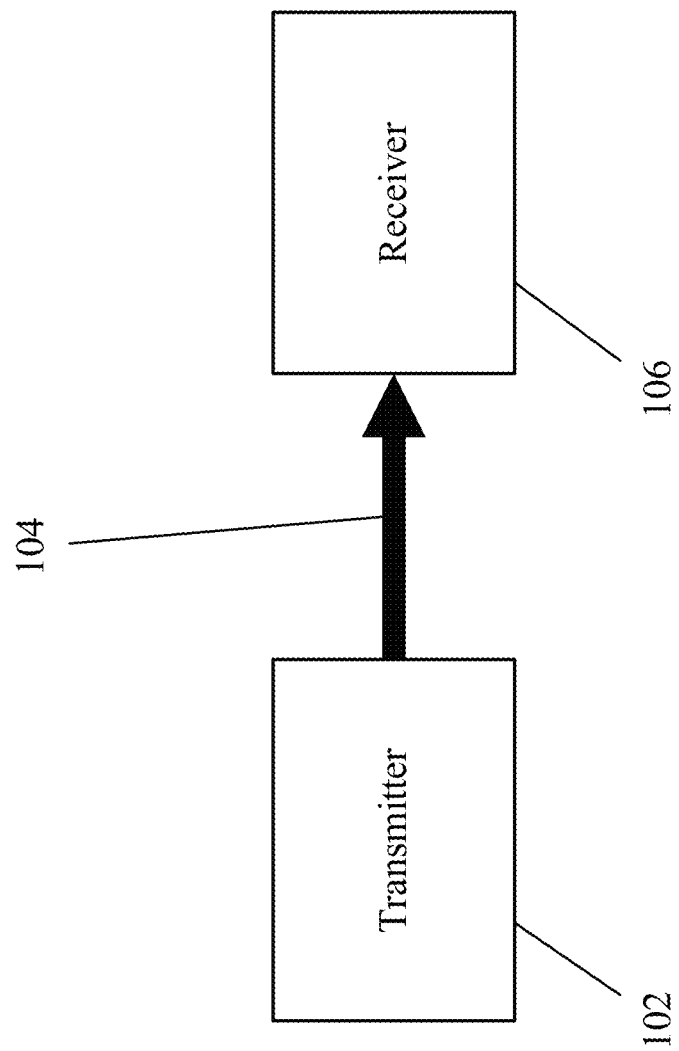
FIG. 1 is a block diagram of a serial data link, according to an embodiment.

Hereinafter, exemplary embodiments of the disclosure will be described in detail with reference to the accompanying drawings in which like reference numerals refer to like elements throughout. It is understood, however, that the disclosure is not limited to embodiments described herein, and that features and components from one embodiment may be included or omitted in another embodiment. For convenience, duplicative description of elements that are the same or similar may be omitted.

Further, it is understood that as used herein, expressions such as "at least one of," when preceding a list of elements, modify the entire list of elements and do not modify the individual elements of the list. For example, the expressions "at least one of [A], [B], and [C]" or "at least one of [A], [B], or [C]" means only A, only B, only C, A and B, B and C, A and C, or A, B, and C.

It is also understood that, although the terms "first," "second," etc., may be used herein to describe various elements, these elements should not be limited by these terms (e.g., should not be interpreted as designating a relative order or significance). These terms are only used to distinguish one element from another.

Additionally, as used herein, the singular forms "a," "an" and "the" are intended to include the plural forms as well, unless otherwise indicated explicitly or by the surrounding context.

The following description is presented to enable one of ordinary skill in the art to make and use the invention and to incorporate it in the context of particular applications. While the foregoing is directed to specific examples, other and further examples may be devised without departing from the basic scope thereof.

Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the description provided, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described hereinafter with reference to the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6 or 35 U.S.C. 112(f).

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Data processing may include data buffering, aligning incoming data from multiple communication lanes, forward error correction ("FEC"), and/or others. For example, data may be first received by an analog front end (AFE), which prepares the incoming data for digital processing. The digital portion (e.g., DSPs) of a transceiver can provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range can be interpreted as being approximate as if the word "about" or "approximately" preceded the value of the value or range. Signals and corresponding nodes or ports might be referred to by the same name and are interchangeable for purposes here.

While embodiments have been described with respect to circuit functions, the embodiments of the present invention are not limited. Possible implementations, may be embodied in a single integrated circuit, a multi-chip module, a single card, system-on-a-chip, or a multi-card circuit pack. As would be apparent to one skilled in the art, the various embodiments might also be implemented as part of a larger system. Such embodiments might be employed in conjunction with, for example, a digital signal processor, microcontroller, field-programmable gate array, application-specific integrated circuit, or general-purpose computer.

As would be apparent to one skilled in the art, various functions of circuit elements might also be implemented as processing blocks in a software program. Such software might be employed in, for example, a digital signal processor, microcontroller, or general-purpose computer. Such software might be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. Described embodiments might also be manifest in the form of a bit stream or other sequence of signal values electrically or optically transmitted through a medium, stored magnetic-field variations in a magnetic recording medium, etc. generated using a method and/or an apparatus as described herein.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

FIG. 1 is a block diagram of a serial data link 100, according to an embodiment. As can be seen in FIG. 1, the serial data link 100 may include a transmitter 102, a channel 104, and a receiver 106. The transmitter 102 may drive the channel 104 with an output that switches between two states, one state representing binary 0 and one representing binary 1. The channel 104 may be a conductor or a plurality of conductors. The channel 104 may include, for example, a single conductor (e.g., over a ground plane) or the channel 104 may include two conductors (e.g., a driven conductor and a separate ground conductor), or the channel 104 may include two driven conductors (e.g., two conductors driven with a differential signal), or three conductors including two driven conductors (e.g., two conductors driven with a differential signal) and a ground conductor. In embodiments, the serial data link may provide a high-speed serial data stream, for example a serial data stream operating on the order of 10 gigabits per second (Gbps), however embodiments are not limited thereto.

Figure 2:
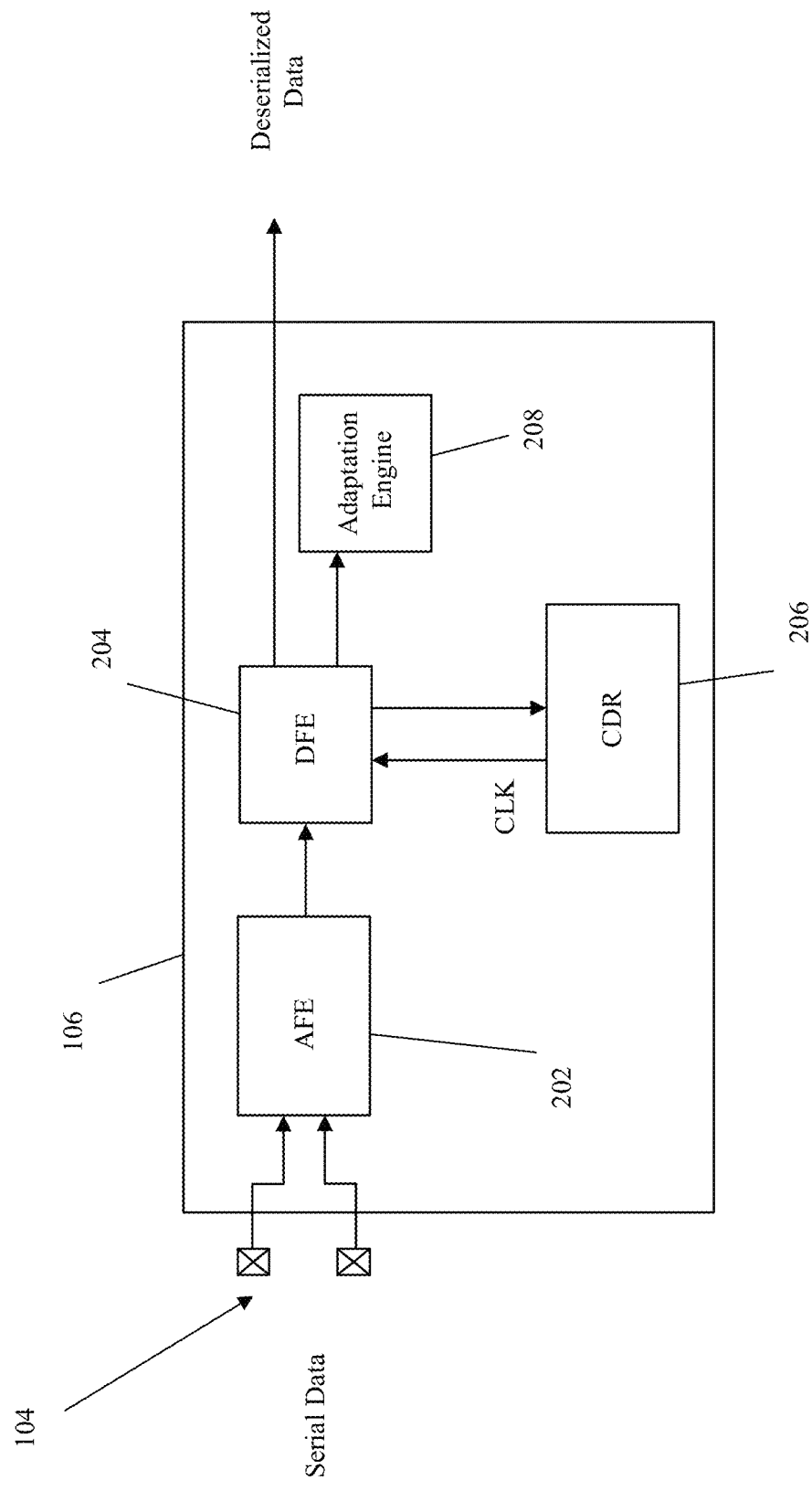
FIG. 2 is a block diagram of a receiver of a serial data link, according to an embodiment.

FIG. 2 is a block diagram of a receiver 106, according to an embodiment. As can be seen in FIG. 2, the receiver 106 may include an analog front end (AFE) 202, a decision-feedback equalizer (DFE) 204, a clock and data recovery circuit (CDR) 206, and an adaptation engine 208. However, embodiments are not limited thereto, and one or more elements shown as being included in the receiver 106 may be outside of the receiver 106, and may send and receive information to and from the receiver 106. In embodiments, the AFE 202 may receive a serial data stream through the channel 104, and the AFE 202, the DFE 204, and the CDR 206 may operate together to provide a deserialized signal corresponding to the serial data stream.

Figure 3:
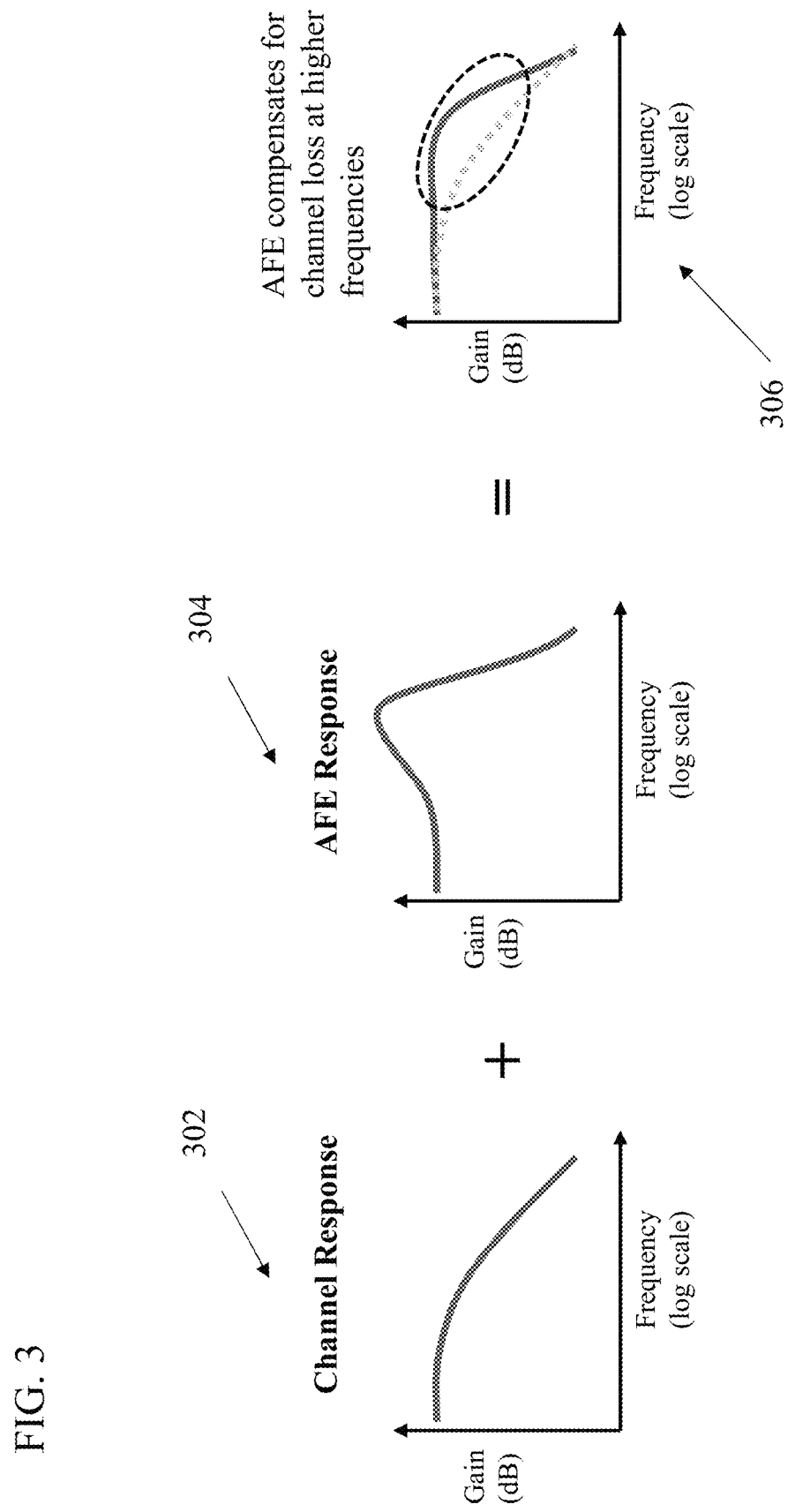
FIG. 3 is a diagram illustrating an example of a frequency response of a channel and a frequency response of an analog front end of a receiver of a serial data link, according to an embodiment.

FIG. 3 is a diagram illustrating an example of a frequency response of a channel and a frequency response of an analog front end of a receiver of a serial data link, according to an embodiment. In embodiments, the AFE 202 may be used to compensate for a signal loss occurring in the channel 104 and to equalize a response of the channel 104. As can be seen in FIG. 3, a frequency response 304 of the AFE 202 may be determined in order to correct or compensate for channel losses in a frequency response 302 of the channel 104, so that a combined frequency response 306 of the channel 104 and the AFE 202 may have reduced attenuation at certain frequencies. In embodiments, the adaptation engine 208 may be used to tune or calibrate one or more parameters of at least one of the AFE 202, the DFE 204, the CDR 206, and any other element included in the receiver 106.

FIGS. 4A-4C are graphs showing examples of tuning outputs of an analog front end of a receiver of a serial data link, according to an embodiment. In embodiments, one or more parameters of the AFE 202 may be tuned or calibrated in order to adjust various aspects of the frequency response of the AFE 202. For example, as shown in FIG. 4A, one or more parameters of the AFE 202 may be modified to perform low-frequency tuning, in which only relatively low frequencies of the frequency response of the AFE 202 are adjusted. As another example, as shown in FIG. 4B, one or more parameters of the AFE 202 may be modified to perform high-frequency tuning, in which only relatively high frequencies of the frequency response of the AFE 202 are adjusted. As yet another example, as shown in FIG. 4C, one or more parameters of the AFE 202 may be modified to perform high/low-frequency tuning, in which both relatively high frequencies and relatively low frequencies of the frequency response of the AFE 202 are adjusted. In embodiments, the high/low-frequency tuning may be referred to as adjusting the variable gain amplifier (VGA) gain of the AFE 202.

Figure 5:
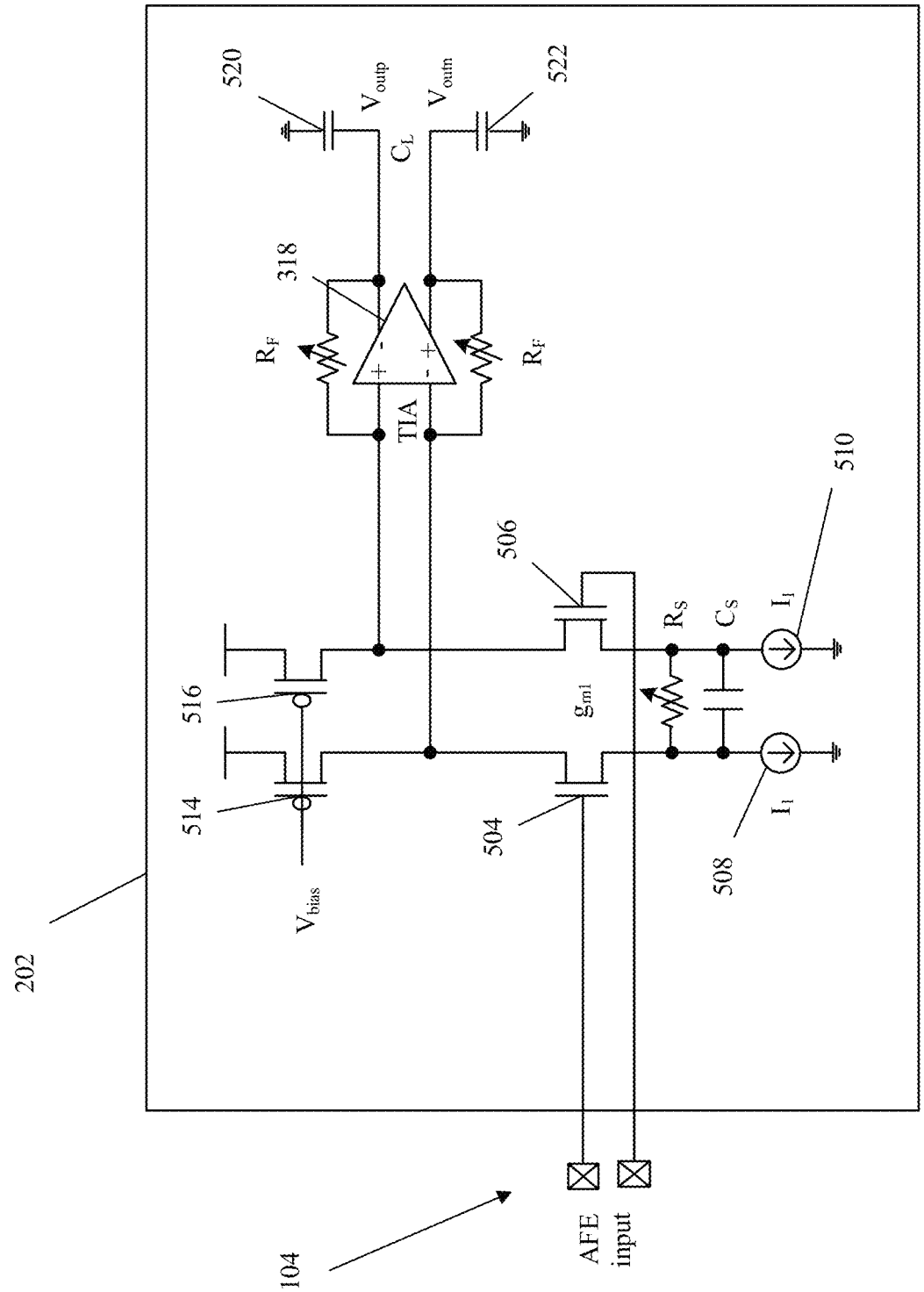
FIG. 5 is a block diagram of an analog front end of a receiver of a serial data link, according to an embodiment.

FIG. 5 is a block diagram of an analog front end of a receiver of a serial data link, according to an embodiment. As can be seen in FIG. 5, the AFE 202 may include an input block including input transistors 504 and 506, a degeneration resistor $R_s$, a capacitor $C_s$, and tail current sources 508 and 510. The AFE 202 may further include bias transistors 514 and 516. In addition the AFE 202 may include a transimpedance amplifier (TIA) block which may include a TIA 518 and one or more feedback resistors $R_F$. In embodiments, the serial data stream may be received from the channel 104 in the form of an input voltage, which may be for example a differential input voltage. An input block of the AFE 202 may perform a voltage-to-current conversion on the input voltage to generate an input current, and the TIA block may perform a current-to-voltage conversion on the input current to generate an output voltage, which may be the differential output voltage. In embodiments, the differential output voltage may be expressed as a positive output voltage $V_{outp}$ at a first output node of the AFE 202, and a negative output voltage $V_{outn}$ at a second output node of the AFE 202.

According to embodiments, the degeneration resistor $R_s$ and the one or more feedback resistors $R_F$ may be used to adjust a gain of the AFE 202. For example, the resistance of the degeneration resistor $R_s$ may be adjustable, and may be used to adjust a low-frequency gain of the AFE 202 in order to perform low-frequency tuning as shown for example in FIG. 4A discussed above. In addition, the resistance of the one or more feedback resistors $R_F$ may be adjustable, and may be used to adjust the VGA gain of the AFE 202 in order to perform high/low-frequency tuning as shown for example in FIG. 4C discussed above. In embodiments, the resistance of the one or more feedback resistors $R_F$ may be referred to as a feedback resistance, and the resistance of the degeneration resistor $R_s$ may be referred to as a degeneration resistance. In embodiments, values of the feedback resistance and the degeneration resistance may be controlled by, for example, the adaptation engine 208.

Figure 6:
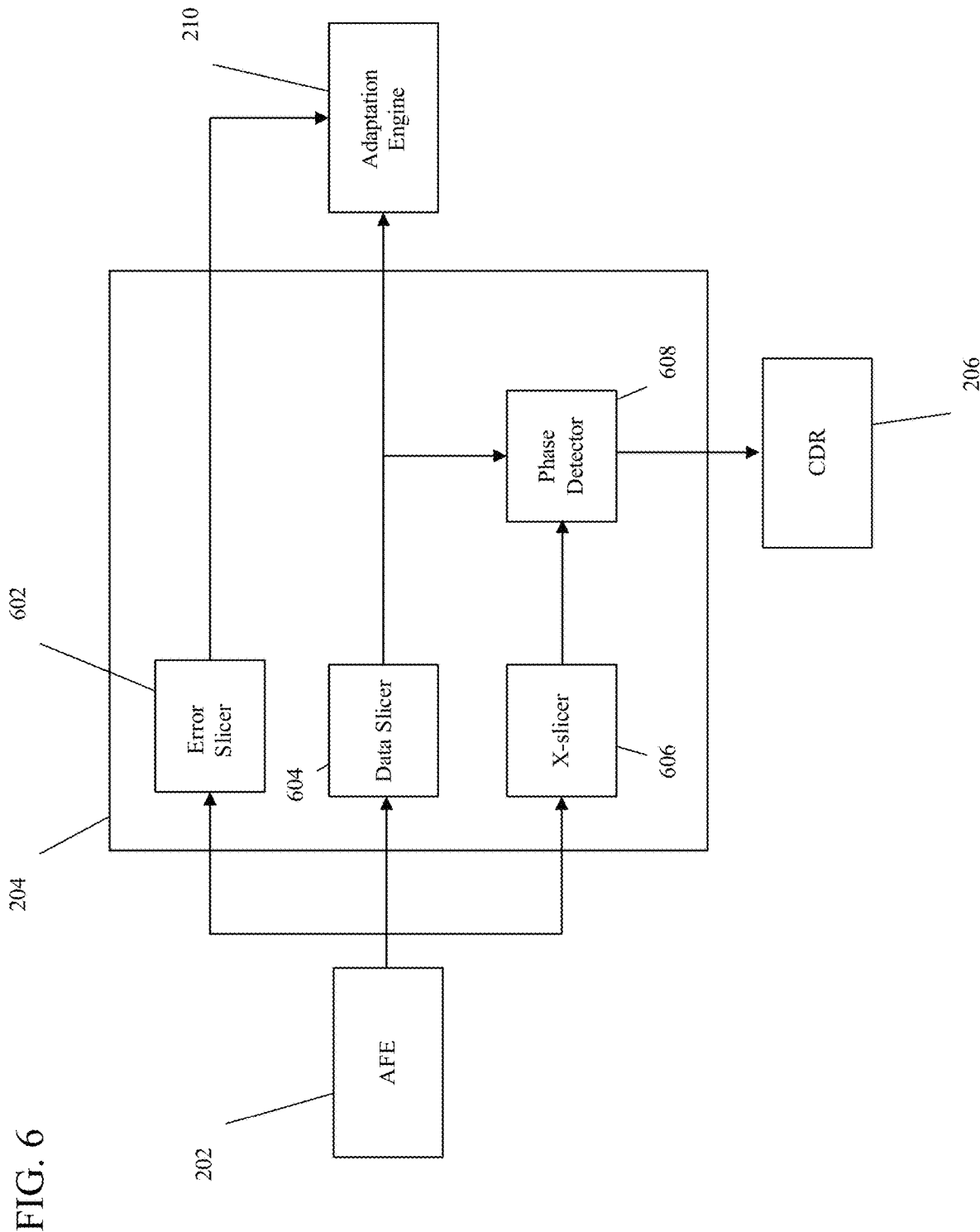
FIG. 6 is a block diagram of a decision feedback equalizer of receiver of a serial data link, according to an embodiment.

FIG. 6 is a block diagram of a decision feedback equalizer of receiver of a serial data link, according to an embodiment. As shown in FIG. 6, the DFE 204 may include an error slicer 602, a data slicer 604, an X-slicer 606, and a phase detector 608. According to embodiments, the channel 104 and the AFE 202 may be represented by a model which includes a number of channel taps H0, H1, H2, etc., each of which may be a coefficient in the discrete-time pulse response of the channel 104 and the AFE 202. In embodiments, a channel tap may represent the characteristics of the cascade of the channel 104 and the AFE 202. The zeroth tap value H0 may indicate (e.g., may be proportional to) the amplitude of the received signal, at the output of the AFE 202.

In embodiments, the output of the AFE 202, which may be an analog signal, may be provided to the data slicer 604 and the error slicer 602. At each clock edge, the data slicer 604 may compare the value of the analog signal output by the AFE 202 to a zero voltage, and may output a data signal having a binary value of one (1) if the analog signal is greater than the zero voltage, and a binary value of zero (0) if the analog signal is less than or equal to the zero voltage. The error slicer 602 may compare the value of the analog signal to the value of H0, and may output an error signal having a binary value of one (1) if the analog signal is greater than the value of H0, and a binary value of zero (0) if the analog signal is less than or equal to the value of H0. In embodiments, the value of H0 may be referred to as a reference voltage corresponding to the error slicer. In embodiments, the binary zero (0) may be mapped to an arithmetic value of negative one (−1).

In embodiments, the X-slicer 606 and the phase detector 608 may be used to detect a phase error between the input data (e.g., the output of the AFE 202) and the clock signal CLK used to sample this data. In embodiments, the X-slicer 606 may capture or slice the input data at a data crossing (which may be referred to as an edge), and may be driven by an XCLK signal having a offset with respect to the clock signal CLK (e.g., a fixed offset of one half of a unit interval (UI) corresponding to the DFE 204). The phase detector 608 may compare an output of the X-slicer 606 and an output of the data slicer 604, and may detect the phase error, or for example a sign of the phase error, based on a result of the comparison.

Figure 7:
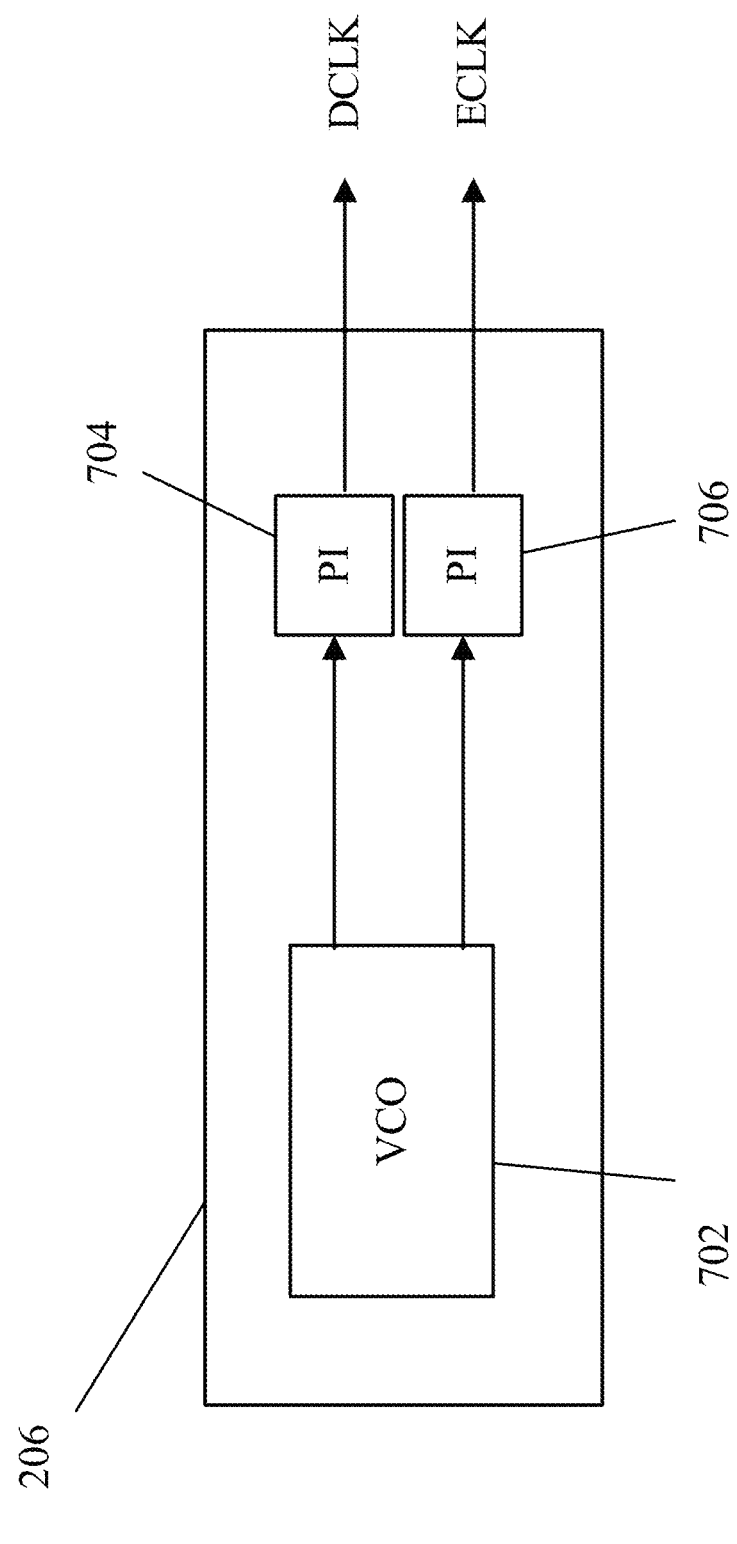
FIG. 7 is a block diagram of a clock and data recovery circuit of a receiver of a serial data link, according to an embodiment.

FIG. 7 is a block diagram of a clock and data recovery circuit of a receiver of a serial data link, according to an embodiment. In embodiments, the clock signal CLK which is output by the CDR 206 may include an error clock signal ECLK which may be provided to the error slicer 602, and a data clock signal DCLK which may be provided to the data slicer 604. As shown in FIG. 7, the CDR 206 may include a voltage-controlled oscillator (VCO) 702 configured to produce a VCO signal, a first phase interpolator (PI) 704 configured to adjust a phase of the VCO signal to generate the data clock signal DLCK, and a second PI 706 configured to adjust the phase of the VCO signal to generate the error clock signal ECLK. Therefore, the error slicer 602 and the data slicer 604 may be operated according to clock signals which have different phases. In embodiments, the first PI 704 and the second PI 706 may be controlled by the adaptation engine 208. In embodiments, the first PI 704 may be fixed, and may be referred to as a dummy PI.

Figure 8:
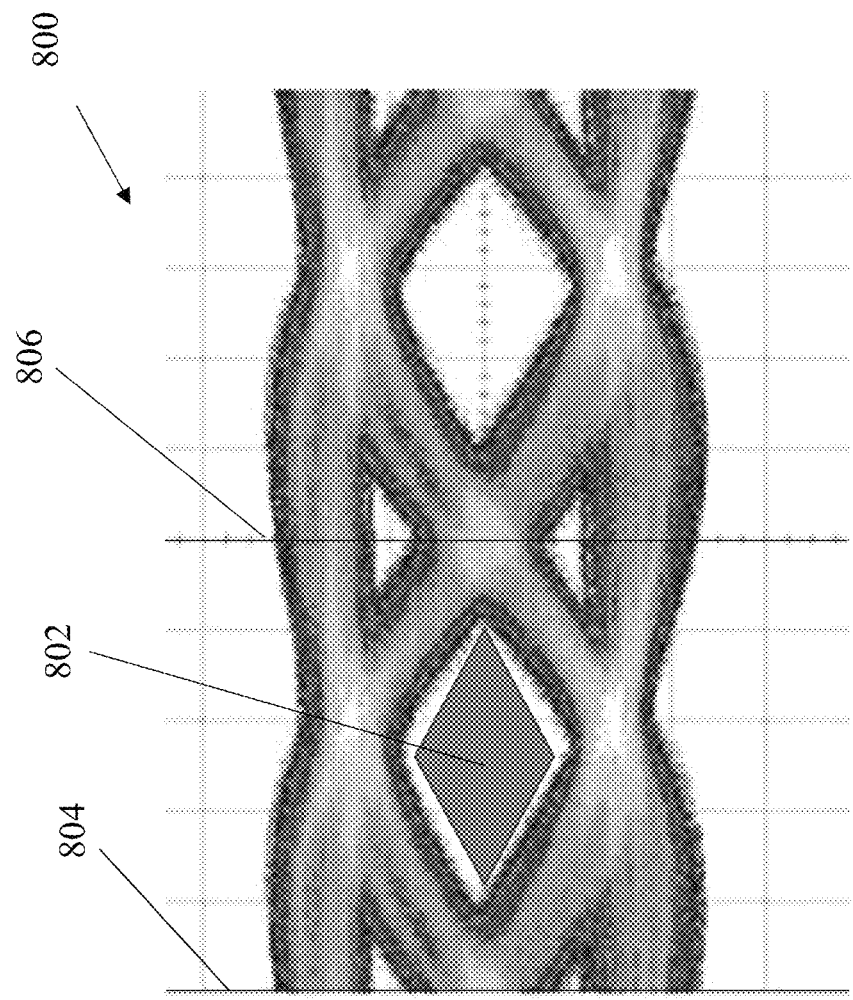
FIG. 8 is an illustration of an eye diagram corresponding to an output of an analog front end of a receiver of a serial data link, according to an embodiment.

FIG. 8 is an illustration of an eye diagram corresponding to an output of an analog front end of a receiver of a serial data link, according to an embodiment. In embodiments, the eye diagram 800 may represent an output of the AFE 202 resulting from an input corresponding to a particular bit sequence. In particular, the eye diagram 800 may be generated by dividing the output of the AFE 202 into intervals having equal lengths, and superimposing these intervals on top of each other. As shown in FIG. 8, the eye diagram 800 may include an eye opening 802 between a first clock edge 804 and a second clock edge 806. In embodiments, an efficient way of optimizing various parameters of the AFE 202 may include maximizing the eye opening 802 of the eye diagram 800 corresponding to the output of the AFE 202.

Figure 9:
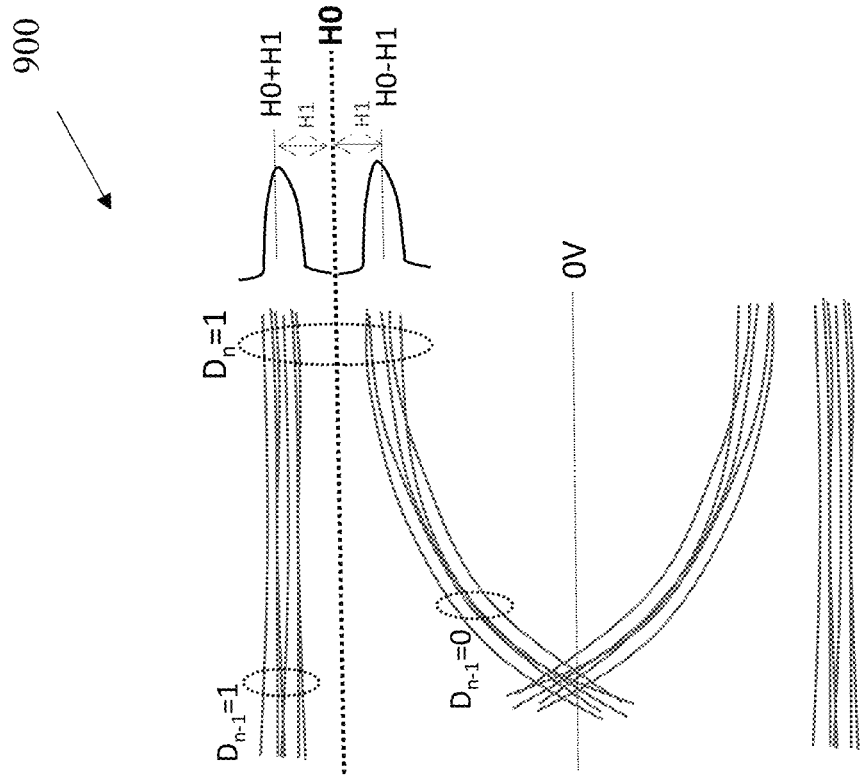
FIG. 9 is an illustration of an eye diagram corresponding to an output of an analog front end of a receiver of a serial data link, according to an embodiment.

FIG. 9 is an illustration of an eye diagram corresponding to an output of an analog front end of a receiver of a serial data link, according to an embodiment. As shown in FIG. 9, $D_n$ may denote a current value of the data signal output by the data slicer 604, and $D_{11}$ may denote a previous value of the data signal output by the data slicer 604. In addition, $E_n$ may denote a current value of the error signal output by the error slicer 602.

In embodiments, the adaptation engine 208 may be used to perform an H0 adaptation process. For example, in order to determine an appropriate value of H0, the adaptation engine 208 may obtain the value of the error signal $E_n$ corresponding to a portion of the eye diagram 900 at which the value of $D_n$ is equal to one (1). Based on the value of the error signal $E_n$ being equal to one (1), the value of H0 may be increased by a particular amount ΔH0. Based on the value of the error signal $E_n$ being equal to zero (1), the value of H0 may be decreased by the amount ΔH0. This process may be performed until the value of H0 converges, for example until the value of the error signal $E_n$ has an equal number of one (1) and zero (0) over a particular period of time.

In embodiments, the adaptation engine 208 may also be used to perform an H1 adaptation process. For example, after the value of H0 is determined as discussed above, in order to determine an appropriate value of H1, the adaptation engine 208 may obtain a value of the error signal $E_n$ corresponding to a portion of the eye diagram 900 at which the value of $D_n$ is equal to one (1). Based on the value of the error signal $E_n$ being equal to one (1), and based on the previous value of the data signal $D_{11}$ being equal to one (1), the value of H1 may be increased by a particular amount ΔH1. Based on the value of the error signal $E_n$ being equal to zero (0), and based on the previous value of the data signal $D_{11}$ being equal to one (1), the value of H1 may be decreased by the amount ΔH1. Based on the value of the error signal $E_n$ being equal to zero (0), and based on the previous value of the data signal $D_{11}$ being equal to zero (0), the value of H1 may be increased by the amount ΔH1. Based on the value of the error signal $E_n$ being equal to one (1), and based on the previous value of the data signal $D_{11}$ being equal to zero (0), the value of H1 may be decreased by the amount ΔH1. This process may be performed until the value of H1 converges, for example until the value of the error signal $E_n$ has an equal number of one (1) and zero (0) over a particular period of time. In embodiments, the H0 adaptation process and the H1 adaptation process may be referred to as a sign-sign least mean square (SS-LMS) adaption process.

Figure 10:
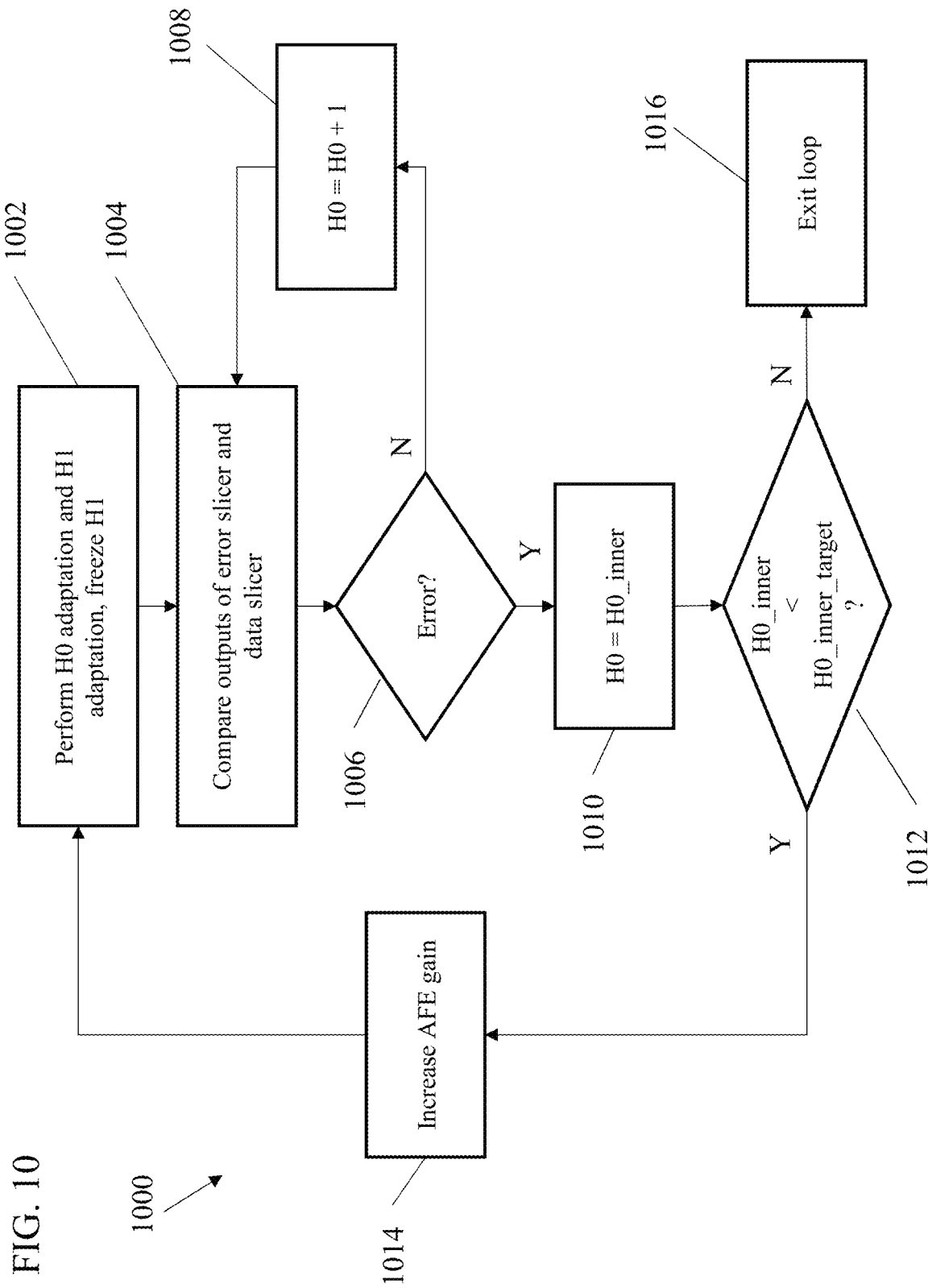
FIG. 10 is a flowchart of a method for adaptive calibration of an analog front end of a receiver of a serial data link, according to an embodiment.
Figure 11:
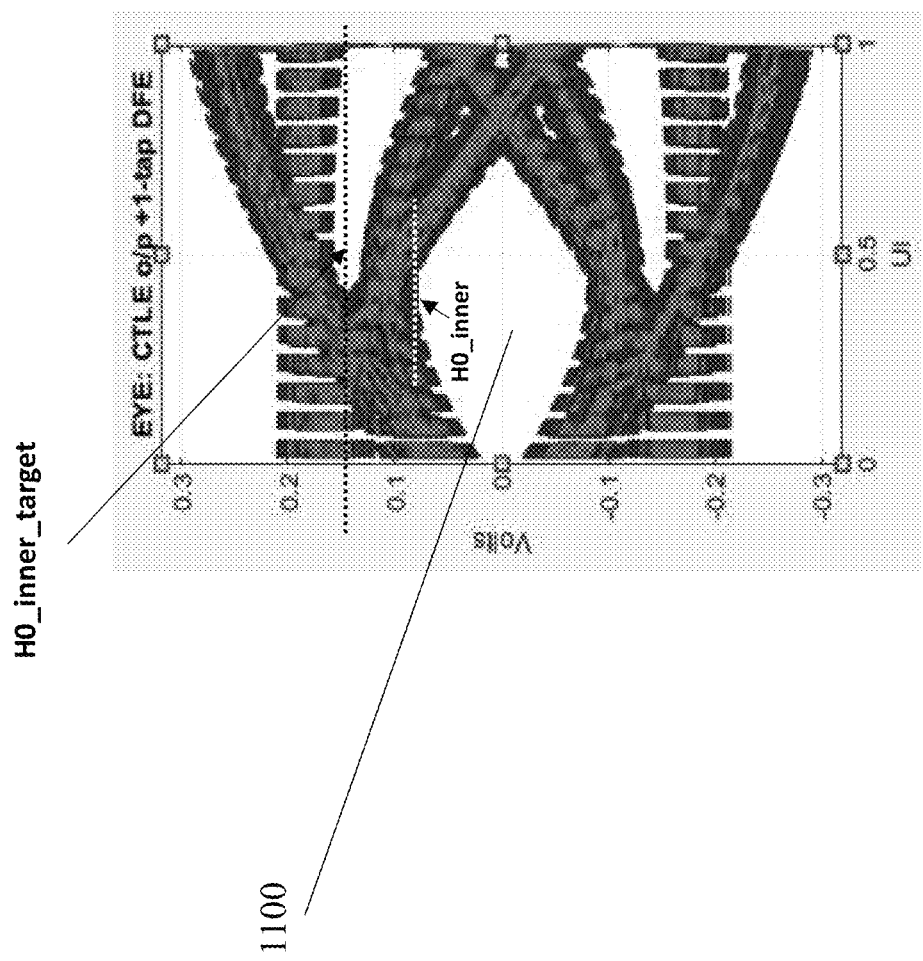
FIG. 11 is an illustration of an eye diagram corresponding to an output of an analog front end of a receiver of a serial data link, according to an embodiment.

FIG. 10 is a flowchart of a method for adaptive calibration of an analog front end of a receiver of a serial data link, according to an embodiment. In embodiments, one or more process blocks of the vertical inner eye adaptation process 1000 may be performed by one or more of the elements discussed above, for example at least one of the receiver and the elements included therein, such as at least one of the AFE 202, the DFE 204, the adaptation engine 208, and the elements included therein. FIG. 11 is an illustration of an example eye diagram corresponding to an output of an analog front end of a receiver of a serial data link during the vertical inner eye adaptation process 1000, according to an embodiment.

As shown in FIG. 10, at operation 1002, the vertical inner eye adaptation process 1000 may include performing the H0 adaptation process and the H1 adaption process discussed above, and freezing the value of H. In embodiments, performing the H0 adaptation process may be referred to as initializing the reference voltage corresponding to the error slicer 602, and performing the H1 adaptation may be referred to as initializing the tap value corresponding to the DFE 204.

As further shown in FIG. 10, at operation 1004, the vertical inner eye adaptation process 1000 may include comparing the error signal $E_n$ output by the error slicer 602 and the data signal $D_n$ output by the data slicer 604.

As further shown in FIG. 10, at operation 1006, the vertical inner eye adaptation process 1000 may include determining whether a result of the comparison indicates an error. For example, an error may be indicated based on the value of the error signal $E_n$ being different from the value of the data signal $D_n$. Based on the result of the comparison not indicating an error (N at operation 1006), the vertical inner eye adaptation process 1000 may proceed to operation 1008. Based on the result of the comparison indicating an error (Y at operation 1006), the vertical inner eye adaptation process 1000 may proceed to operation 1010.

As further shown in FIG. 10, at operation 1008, the vertical inner eye adaptation process 1000 may include increasing the value of H0, and returning to operation 1004.

As further shown in FIG. 10, at operation 1010, the vertical inner eye adaptation process 1000 may include setting the value of H0_inner to be equal to the value of H0. In embodiments, H0_inner may denote a value of H0 corresponding to a top edge of the inner eye opening 1100.

As further shown in FIG. 10, at operation 1012, the vertical inner eye adaptation process 1000 may include determining whether the value of H0_inner is less than a threshold value H0_inner_target. In embodiments, the value H0_inner_target may be referred to as a reference voltage target. Based on the value of H0_inner being greater than or equal to the threshold value H0_inner_target (N at operation 1012), the vertical inner eye adaptation process 1000 may proceed to operation 1016, at which the vertical inner eye adaptation process 1000 may be terminated. Based on the value of H0_inner being less than the threshold H0_inner_target (Y at operation 1012), the vertical inner eye adaptation process 1000 may proceed to operation 1014. Accordingly, the vertical inner eye adaptation process 1000 may be an iterative process which proceeds until the top edge of the inner eye opening 1100 is reached.

As further shown in FIG. 10, at operation 1014, the vertical inner eye adaptation process 1000 may include increasing a gain of the AFE 202. In embodiments, this gain may be the VGA gain discussed above, and may be increased by adjusting a value of the feedback resistor $R_F$. For example, the adaptation engine 208 may adjust the feedback resistance of the feedback resistor $R_F$ in order to adjust the gain of the AFE 202.

After operation 1014, the vertical inner eye adaptation process 1000 may return to operation 1002. In embodiments, changing a parameter of the AFE 202, for example changing the VGA gain, may cause the values of H0 and H1 to be no longer valid, and therefore these values may be determined again before performing another loop or iteration of the vertical inner eye adaptation process 1000.

Figure 12:
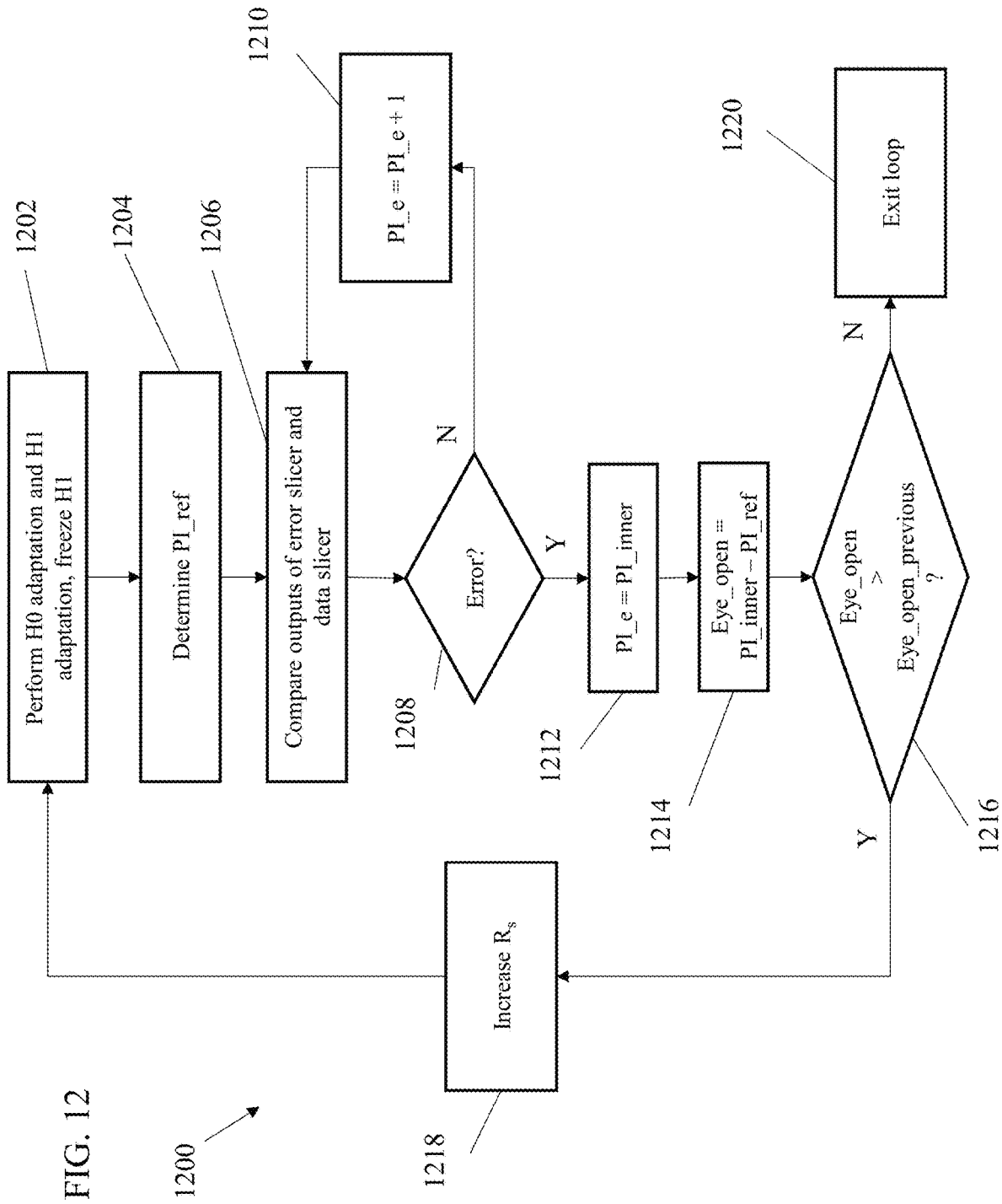
FIG. 12 is a flowchart of a method for adaptive calibration of an analog front end of a receiver of a serial data link, according to an embodiment.
Figure 13:
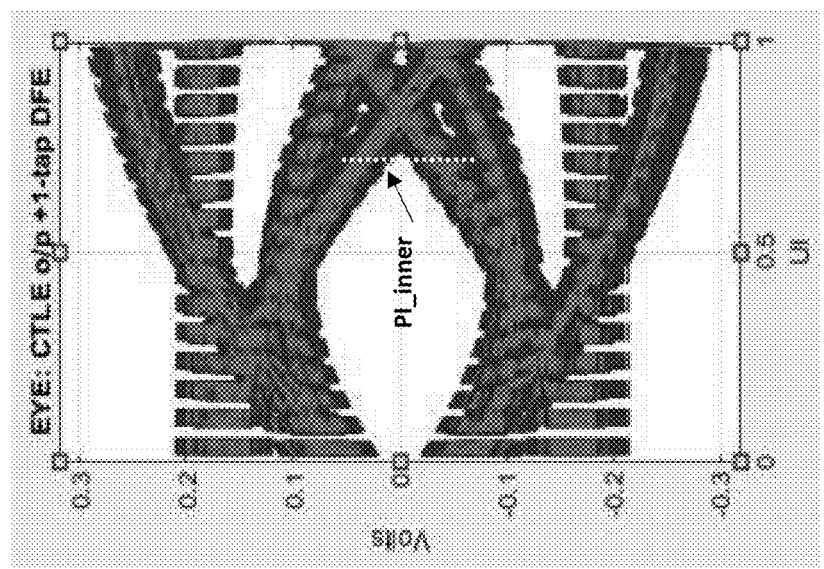
FIG. 13 is an illustration of an eye diagram corresponding to an output of an analog front end of a receiver of a serial data link, according to an embodiment.

FIG. 12 is a flowchart of a method for adaptive calibration of an analog front end of a receiver of a serial data link, according to an embodiment. In embodiments, one or more process blocks of the horizontal inner eye adaptation process 1200 illustrated in FIG. 12 may be performed by one or more of the elements discussed above, for example at least one of the receiver and the elements included therein, such as at least one of the AFE 202, the DFE 204, the adaptation engine 208, and the elements included therein. FIG. 13 is an illustration of an example eye diagram corresponding to an output of an analog front end of a receiver of a serial data link during the vertical inner eye adaptation process 1000, according to an embodiment.

As shown in FIG. 12, at operation 1202, the horizontal inner eye adaptation process 1200 may include performing the H0 adaptation process and the H1 adaption process discussed above, and freezing the value of H1. In embodiments, performing the H0 adaptation process may be referred to as initializing the reference voltage corresponding to the error slicer 602, and performing the H1 adaptation may be referred to as initializing the tap value corresponding to the DFE 204.

As further shown in FIG. 12, at operation 1206, the horizontal inner eye adaptation process 1200 may include adjusting the phase PI_e of the error clock signal ECLK to be equal to a reference phase PI_ref. In embodiments, PI_ref may denote a phase at which the error clock signal ECLK is identical to the data clock signal DCLK. In embodiments, setting the phase PI_e to be equal to the reference phase PI_ref may be referred to as initializing the phase PI_e. In embodiments, the phase PI_e of the error clock signal ECLK may be adjusted using the second PI 706. For example, the adaptation engine 208 may adjust a parameter of the second PI 706 in order to adjust the phase PI_e of the error clock signal ECLK.

As further shown in FIG. 12, at operation 1206, the horizontal inner eye adaptation process 1200 may include comparing the error signal $E_n$ output by the error slicer 602 and the data signal $D_1$ output by the data slicer 604.

As further shown in FIG. 12, at operation 1208, the horizontal inner eye adaptation process 1200 may include determining whether a result of the comparison indicates an error. For example, an error may be indicated based on the value of the error signal $E_n$ being different from the value of the data signal $D_n$. Based on the result of the comparison not indicating an error (N at operation 1206), the horizontal inner eye adaptation process 1200 may proceed to operation 1210. Based on the result of the comparison indicating an error (Y at operation 1206), the horizontal inner eye adaptation process 1200 may proceed to operation 1212.

As further shown in FIG. 12, at operation 1210, the horizontal inner eye adaptation process 1200 may include increasing the value of the phase PI_e of the error clock signal ECLK, and returning to operation 1204.

As further shown in FIG. 12, at operation 1212, the horizontal inner eye adaptation process 1200 may include setting the value of PI_inner to be equal to the value of PI_e. As further shown in FIG. 12, at operation 1214, the horizontal inner eye adaptation process 1200 may include setting the value of Eye_open to be equal to the value of PI_e minus the value of PI_ref. In embodiments, Eye_open may denote a value of PI_e corresponding to a side edge of the inner eye opening 1300.

As further shown in FIG. 12, at operation 1216, the horizontal inner eye adaptation process 1200 may include determining whether the value of Eye_open is greater than a value of Eye_open_previous. In embodiments, Eye_open_previous may denote a previous value of Eye_open, for example a value of Eye_open obtained in a previous loop or a previous iteration of the horizontal inner eye adaptation process 1200. Based on the value of Eye_open not being greater than the value of Eye_open_previous (N at operation 1216), the horizontal inner eye adaptation process 1200 may proceed to operation 1220, at which the horizontal inner eye adaptation process 1200 may be terminated. Based on the value of Eye_open being greater than the value of Eye_open_previous (Y at operation 1212), the horizontal inner eye adaptation process 1200 may proceed to operation 1218. Accordingly, the horizontal inner eye adaptation process 1200 may be an iterative process which proceeds until the horizontal size of the inner eye opening 1300 stops increasing.

As further shown in FIG. 12, at operation 1218, the horizontal inner eye adaptation process 1200 may include increasing the resistance of the degeneration resistor $R_S$. After operation 1214, the horizontal inner eye adaptation process 1200 may return to operation 1202. In embodiments, changing a parameter of the AFE 202, for example changing the VGA gain, may cause the values of H0 and H1 to be no longer valid, and therefore these values may be determined again before performing another loop or iteration of the horizontal inner eye adaptation process 1200.

Figure 14:
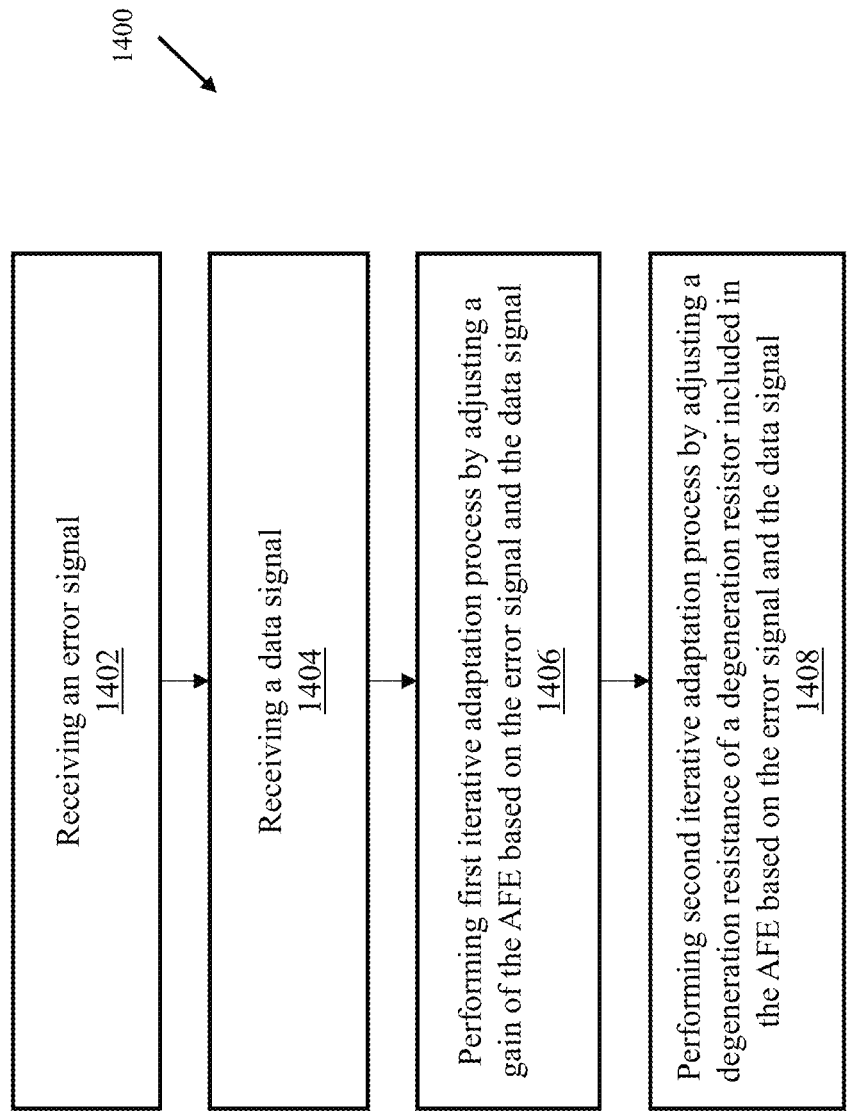
FIG. 14 is a flowchart of a method for adaptive calibration of an analog front end of a receiver of a serial data link, according to an embodiment.

FIG. 14 is a flowchart of a method for adaptive calibration of an analog front end of a receiver of a serial data link, according to an embodiment. In embodiments, one or more process blocks of the adaptation process 1400 illustrated in FIG. 14 may be performed by one or more of the elements discussed above, for example at least one of the receiver and the elements included therein, such as at least one of the AFE 202, the DFE 204, the adaptation engine 208, and the elements included therein.

As shown in FIG. 14, at operation 1402, adaptation process 1400 may include receiving an error signal, for example the error signal generated by the error slicer 602. At operation 1404, the adaptation process 1400 may include receiving a data signal, for example the data signal generated by the data slicer 604.

At operation 1406, the adaptation process 1400 may include first iterative adaptation process by adjusting a gain of the AFE 202 based on the error signal and the data signal. In embodiments, this gain may be the VGA gain discussed above, and may be increased by adjusting a value of the feedback resistor $R_F$. For example, the adaptation engine 208 may adjust the feedback resistance of the feedback resistor $R_F$ in order to adjust the gain of the AFE 202. In embodiments, the first iterative adaptation process may correspond to the vertical inner eye adaption process 1000 discussed above.

At operation 1408, the adaptation process 1400 may include performing second iterative adaptation process by adjusting a degeneration resistance of a degeneration resistor Rs included in the AFE 202 based on the error signal and the data signal. In embodiments, the degeneration resistance may be the resistance of the degeneration resistor $R_s$. In embodiments, the second iterative adaptation process may correspond to the horizontal inner eye adaption process 1200 discussed above.

In embodiments, operation 1406 may be performed after operation 1408, because adjusting the inner eye opening according to the horizontal inner eye adaption process 1200 may have no effect, or a minimal effect, on the vertical inner eye opening adjusted according to the vertical inner eye adaption process 1000.

Although FIGS. 10, 12, and 14 show example blocks of processes 1000, 1200, and 1400, in some implementations, processes 1000, 1200, and 1400 may include additional blocks, fewer blocks, different blocks, or differently arranged blocks than those depicted in FIGS. 10, 12, and 14. Additionally, or alternatively, two or more of the blocks of processes 1000, 1200, and 1400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, software, firmware, or a combination thereof.

It will be apparent that systems and/or methods, described herein, may be implemented in different forms of hardware, software, firmware, or a combination thereof. The actual specialized control hardware or software code used to implement these systems and/or methods is not limiting the implementations. Thus, the operation and behavior of the systems and/or methods were described herein without reference to specific software code-it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

While one or more exemplary embodiments have been described above with reference to the figures, it will be understood by those of ordinary skill in the art that various changes in form and details may be made therein without departing from the spirit and scope as defined at least in part by the following claims.

What is claimed is:

1. A receiver for a serial data link, the receiver comprising:
an analog front end (AFE) configured to receive a serial data stream and to generate an AFE output signal based on the serial data stream;
a decision feedback equalizer (DFE) configured to receive the AFE output signal and to output deserialized data based on the AFE output signal, wherein the DFE comprises an error slicer configured to output an error signal based on a comparison between the AFE output signal and a reference voltage; and
an adaptation engine configured to perform a first adaptation process associated with the AFE, wherein the first adaptation process includes adjusting the reference voltage based on the error signal, and adjusting a gain of the AFE based on a comparison between the adjusted reference voltage and a reference voltage target.

2. The receiver of claim 1, wherein the DFE further comprises a data slicer configured to output a data signal based on a comparison between the AFE output signal and a zero voltage, and
wherein to perform the first adaptation process, the adaptation engine is further configured to:
initialize the reference voltage,
initialize a tap value associated with the DFE based on the reference voltage,
adjust the reference voltage until a value of the error signal is different from a value of the data signal to obtain the adjusted reference voltage,
compare the adjusted reference voltage with the reference voltage target, and
based on the adjusted reference voltage being less than the reference voltage target, increase the gain of the AFE.

3. The receiver of claim 2, wherein the adaptation engine is further configured to increase the gain of the AFE by adjusting a feedback resistance of at least one feedback resistor included in the AFE, and
wherein the increasing the gain of the AFE causes an inner eye opening included in an eye diagram corresponding to the AFE output signal to be increased in a vertical direction.

4. The receiver of claim 2, wherein the adaptation engine is further configured to:
based on the adjusted reference voltage being less than the reference voltage target, perform the first adaptation process again, and
based on the adjusted reference voltage being greater than or equal to the reference voltage target, exit the first adaptation process.

5. The receiver of claim 2, further comprising a phase interpolator configured to adjust a phase of a clock signal which is provided to the DFE,
wherein the AFE comprises a degeneration resistor having a degeneration resistance,
wherein the adaptation engine is further configured to perform a second adaptation process associated with the AFE, and wherein to perform the second adaptation process, the adaptation engine is further configured to:
initialize the reference voltage,
initialize the tap value based on the reference voltage,
initialize the phase to a reference phase,
adjust the phase until the value of the error signal is different from the value of the data signal,
determine a current phase value by subtracting the reference phase from the adjusted phase, and
based on the current phase value being greater than a previous phase value, increase the degeneration resistance.

6. The receiver of claim 5, wherein the increasing the degeneration resistance causes an inner eye opening included in an eye diagram corresponding to the AFE output signal to be increased in a horizontal direction.

7. The receiver of claim 5, wherein the adaptation engine is further configured to perform the second adaptation process after the first adaptation process is performed.

8. The receiver of claim 5, wherein the adaptation engine is further configured to:
based on the current phase value being greater than the previous phase value, perform the second adaptation process again, and
based on the current phase value being less than or equal to the previous phase value, exit the second adaptation process.

9. The receiver of claim 2, wherein to initialize the reference voltage, the adaptation engine is further configured to:
obtain the value of the error signal and the value of the data signal,
based on the value of the error signal being same as the value of the data signal, increase the reference voltage, and
based on the value of the error signal being different from the value of the data signal, decrease the reference voltage.

10. The receiver of claim 2, wherein to initialize the tap value, the adaptation engine is further configured to:
obtain the value of the error signal and the value of the data signal,
based on a previous value of the data signal being same as the value of the data signal, and based on the value of the error signal being same as the value of the data signal, increase the tap value,
based on the previous value of the data signal being same as the value of the data signal, and based on the value of the error signal being different from the value of the data signal, decrease the tap value,
based on the previous value of the data signal being different from the value of the data signal, and based on the value of the error signal being different from the value of the data signal, increase the tap value, and
based on the previous value of the data signal being different from the value of the data signal, and based on the value of the error signal being same as the value of the data signal, decrease the tap value.

11. An adaptation engine included in a receiver of a serial data link, the adaptation engine comprising:
at least one processor configured to:
receive an error signal generated by an error slicer included in a decision feedback equalizer (DFE), wherein the error signal is generated by the error slicer based on a comparison between a reference voltage and an analog front end (AFE) output signal, and wherein the AFE output signal is generated by an AFE based on a serial data stream,
receive a data signal generated by a data slicer included in the DFE, wherein the data signal is generated by the data slicer based on a comparison between a zero voltage and the AFE output signal,
perform a first iterative adaptation process corresponding to the AFE by adjusting a gain of the AFE based on the error signal and the data signal, and
perform a second iterative adaptation process corresponding to the AFE by adjusting a degeneration resistance of a degeneration resistor included in the AFE based on the error signal and the data signal.

12. The adaptation engine of claim 11, wherein to perform a current iteration of the first iterative adaptation process, the at least one processor is further configured to:
initialize the reference voltage,
initialize a tap value associated with the DFE based on the reference voltage,
adjust the reference voltage until a value of the error signal is different from a value of the data signal,
compare the adjusted reference voltage with a reference voltage target,
based on the adjusted reference voltage being less than the reference voltage target, increase the gain of the AFE, and perform a next iteration of the first iterative adaptation process, and
based on the adjusted reference voltage being greater than or equal to the reference voltage target, exit the first iterative adaptation process.

13. The adaptation engine of claim 12, wherein the at least one processor is further configured to increase the gain of the AFE by adjusting a resistance of at least one feedback resistor included in the AFE, and
wherein the increasing the gain of the AFE causes an inner eye opening included in an eye diagram corresponding to the AFE output signal to be increased in a vertical direction.

14. The adaptation engine of claim 12,
wherein to initialize the reference voltage, the at least one processor is further configured to:
obtain the value of the error signal and the value of the data signal,
based on the value of the error signal being same as the value of the data signal, increase the reference voltage, and
based on the value of the error signal being different from the value of the data signal, decrease the reference voltage, and
wherein to initialize the tap value, the at least one processor is further configured to:
obtain the value of the error signal and the value of the data signal,
based on a previous value of the data signal being same as the value of the data signal, and based on the value of the error signal being same as the value of the data signal, increase the tap value,
based on the previous value of the data signal being same as the value of the data signal, and based on the value of the error signal being different from the value of the data signal, decrease the tap value,
based on the previous value of the data signal being different from the value of the data signal, and based on the value of the error signal being different from the value of the data signal, increase the tap value, and based on the previous value of the data signal being different from the value of the data signal, and based on the value of the error signal being same as the value of the data signal, decrease the tap value.

15. The adaptation engine of claim 11, further comprising a phase interpolator configured to adjust a phase of a clock signal which is provided to the DFE,
wherein to perform a current iteration of the second iterative adaptation process, the at least one processor is further configured to:
initialize the reference voltage,
initialize a tap value associated with the DFE based on the reference voltage,
initialize the phase to a reference phase,
adjust the phase until the value of the error signal is different from the value of the data signal,
determine a current phase value by subtracting the reference phase from the adjusted phase,
based on the current phase value being greater than a previous phase value, increase the degeneration resistance, and perform a next iteration of the second iterative adaptation process, and
based on the current phase value being less than or equal to the previous phase value, exit the second iterative adaptation process.

16. The adaptation engine of claim 15, wherein the increasing the degeneration resistance causes an inner eye opening included in an eye diagram corresponding to the AFE output signal to be increased in a horizontal direction.

17. The adaptation engine of claim 15,
wherein to initialize the reference voltage, the at least one processor is further configured to:
obtain the value of the error signal and the value of the data signal,
based on the value of the error signal being same as the value of the data signal, increase the reference voltage, and
based on the value of the error signal being different from the value of the data signal, decrease the reference voltage, and
wherein to initialize the tap value, the at least one processor is further configured to:
obtain the value of the error signal and the value of the data signal,
based on a previous value of the data signal being same as the value of the data signal, and based on the value of the error signal being same as the value of the data signal, increase the tap value,
based on the previous value of the data signal being same as the value of the data signal, and based on the value of the error signal being different from the value of the data signal, decrease the tap value,
based on the previous value of the data signal being different from the value of the data signal, and based on the value of the error signal being different from the value of the data signal, increase the tap value, and
based on the previous value of the data signal being different from the value of the data signal, and based on the value of the error signal being same as the value of the data signal, decrease the tap value.

18. A method of adapting an analog front end (AFE) included in a receiver of a serial data link, the method comprising:
receiving an error signal generated by an error slicer included in a decision feedback equalizer (DFE) included in the receiver, wherein the error signal is generated by the error slicer based on a comparison between a reference voltage and an AFE output signal, and wherein the AFE output signal is generated by the AFE based on a serial data stream;
receiving a data signal generated by a data slicer included in the DFE, wherein the data signal is generated by the data slicer based on a comparison between a zero voltage and the AFE output signal;
performing a first iterative adaptation process corresponding to the AFE by adjusting a gain of the AFE based on the error signal and the data signal; and
performing a second iterative adaptation process corresponding to the AFE by adjusting a degeneration resistance of a degeneration resistor included in the AFE based on the error signal and the data signal.

19. The method of claim 18, wherein performing a current iteration of the first iterative adaptation process comprises:
initializing the reference voltage;
initializing a tap value associated with the DFE based on the reference voltage;
adjusting the reference voltage until a value of the error signal is different from a value of the data signal;
comparing the adjusted reference voltage with a reference voltage target;
based on the adjusted reference voltage being less than the reference voltage target;
increasing the gain of the AFE, and performing a next iteration of the first iterative adaptation process; and
based on the adjusted reference voltage being greater than or equal to the reference voltage target, exiting the first iterative adaptation process.

20. The method of claim 19,
wherein the initializing the reference voltage comprises:
obtaining the value of the error signal and the value of the data signal,
based on the value of the error signal being same as the value of the data signal, increasing the reference voltage; and
based on the value of the error signal being different from the value of the data signal, decreasing the reference voltage, and
wherein the initializing the tap value comprises:
obtaining the value of the error signal and the value of the data signal;
based on a previous value of the data signal being same as the value of the data signal, and based on the value of the error signal being same as the value of the data signal; increasing the tap value;
based on the previous value of the data signal being same as the value of the data signal, and based on the value of the error signal being different from the value of the data signal, decreasing the tap value;
based on the previous value of the data signal being different from the value of the data signal, and based on the value of the error signal being different from the value of the data signal, increasing the tap value; and
based on the previous value of the data signal being different from the value of the data signal, and based on the value of the error signal being same as the value of the data signal, decreasing the tap value.

21. The method of claim 18, wherein performing a current iteration of the second iterative adaptation process comprises:
initializing the reference voltage;
initializing a tap value associated with the DFE based on the reference voltage;

initializing a phase of a clock signal which is provided to the DFE to a reference phase;
adjusting the phase until the value of the error signal is different from the value of the data signal;
determining a current phase value by subtracting the reference phase from the adjusted phase;
based on the current phase value being greater than a previous phase value, increasing the degeneration resistance, and performing a next iteration of the second iterative adaptation process; and
based on the current phase value being less than or equal to the previous phase value, exiting the second iterative adaptation process.

* * * * *